United States Patent
Yun et al.

(10) Patent No.: US 9,448,838 B2
(45) Date of Patent: Sep. 20, 2016

(54) METHOD FOR RECORDING USER INPUT TASKS FOR CONTROLLING A TERMINAL

(71) Applicant: LG ELECTRONICS INC., Seoul (KR)

(72) Inventors: Chungha Yun, Seoul (KR); Sunok Kim, Seoul (KR); Seunghyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 13/974,514

(22) Filed: Aug. 23, 2013

(65) Prior Publication Data

US 2014/0223438 A1    Aug. 7, 2014

(30) Foreign Application Priority Data

Feb. 1, 2013    (KR) .................... 10-2013-0011665

(51) Int. Cl.
*G06F 9/48*    (2006.01)
*G06F 9/455*    (2006.01)
*G06F 9/44*    (2006.01)
*G06F 9/46*    (2006.01)

(52) U.S. Cl.
CPC ........... *G06F 9/4812* (2013.01); *G06F 9/4443* (2013.01); *G06F 9/45512* (2013.01)

(58) Field of Classification Search
None
See application file for complete search history.

(56) References Cited

U.S. PATENT DOCUMENTS

2005/0278728 A1   12/2005   Klementiev
2009/0222726 A1    9/2009   Kintzley

OTHER PUBLICATIONS

Acklen et al., "Using WordPerfec Office X3," Internet Citation, Apr. 4, 2006, 20 pages total, XP002460861.
Horowitz et al., "Graphical User Interface Testing," International Journal of Information Technology and Web Engineering, Apr. 1, 2008, 20 pages total, XP055099601.
Hupp et al., "Smart Bookmarks: Automatic Retroactive Macro Recording on the Web," Proceedings of the 20th Annual ACM Symposium on User Interface Software and Technology, Oct. 7, 2007, 10 pages, XP055099617.
Lau, "Social Scripting for the Web," IEEE-Computer, vol. 40, No. 6, Jun. 1, 2007, pp. 96-98, XP011506921.
Little et al., "Koala: Capture, Share, Automate, Personalize Business Processes on the Web," CHI 2007 Proceedings, Apr. 28-May 3, 2007, pp. 943-946, XP055099614.

*Primary Examiner* — Eric C Wai
(74) *Attorney, Agent, or Firm* — Birch, Stewart, Kolasch & Birch, LLP

(57) ABSTRACT

There is disclosed a method for controlling a terminal including starting to record tasks, creating a task list by recording the tasks, when a plurality of tasks are implemented sequentially, ending the recording of the task, wherein the task list comprises an interrupt task configured to pause the task implementation and to allow the next task implemented when there is an additional input, such that the task list configured of the series of the tasks used by the user frequently may be created and the task list may be implemented automatically, only to perform the functions used frequently performed quickly.

16 Claims, 19 Drawing Sheets

(a)  (b)

(a)　　　　　　　　　　(b)

(a)

(b)

(a)

(b)

(a)

(b)

(a)  (b)

(a)　　　　　　　　　　　　　(b)

(a)

(b)

(a)

(b)

METHOD FOR RECORDING USER INPUT TASKS FOR CONTROLLING A TERMINAL

Pursuant to 35 U.S.C. §119(a), this application claims the benefit of earlier filing date and right of priority to Korean Application No. 10-2013-0011665, filed on Feb. 1, 2013, the contents of which are hereby incorporated by reference herein in their entirety.

BACKGROUND OF THE DISCLOSURE

1. Field of the Disclosure

The present invention relates to a method for controlling a terminal that includes an interrupt task requiring a user's auxiliary input during the implementation of a task list having a series of tasks sequentially recorded therein.

2. Discussion of the Related Art

Generally, terminals can be classified into mobile terminals and stationary terminals. In addition, the mobile terminals can be further classified into handheld terminals and vehicle mount terminals.

Further, a mobile terminal is a device which may be configured to perform various functions such as data and voice communications, capturing images and video via a camera, recording audio, playing music files and outputting music via a speaker system, and displaying images and video on a display.

Even if functions of such a mobile terminal are diverse, there are functions a user uses often and it is increasingly required to improve functions personalized for a user.

SUMMARY OF THE DISCLOSURE

To overcome the disadvantages, an object of the present invention is to provide a method for controlling a terminal that includes an interrupt task requiring a user's auxiliary input during the implementation of a task list having a series of tasks sequentially recorded therein.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a terminal includes starting to record tasks; creating a task list by recording the tasks, when a plurality of tasks are implemented sequentially; ending the recording of the tasks, wherein the task list comprises an interrupt task configured to pause the task implementation and to allow the next task implemented when there is an additional input.

The step of starting to record the tasks or the step of ending the recording may be performed by at least one of a user voice command, specific icon selected by the user and a specific gesture.

The step of creating the task list may include steps of pausing the recording of the task list; and re-starting the recording of the task list when there is an additional input.

The step of pausing the recording of the task list may pause the recording of the task list, when an indicator configured to indicate a state of each step is selected.

The interrupt task may select one of objects.

The interrupt task may input a text.

The input text may be a text converted from the user voice.

The interrupt task may be a user identification step.

The tasks implemented sequentially may be stored as a file and the file is transmittable to another terminal.

The method for controlling the terminal may further include step of providing the tasks recorded sequentially to the user in a thumbnail image or a flow chart.

The task list may perform at least one of task order changing, task deleting, task adding and task code setting.

The indicator configured to guide a state of each step is displayed.

In another aspect, a method for controlling a terminal includes steps of creating or transmitting a task list comprising a plurality of tasks arranged sequentially and an interrupt task configured to pause the task implementation and to implement the following task when there is an additional input; starting to implement the task list; implementing the tasks sequentially until the interrupt task; pausing the task implementation; and implementing a task following the interrupt task, when an additional input corresponding to the interrupt task is detected.

The step of starting to implement the task list may be performed through at least one of a user voice command, a specific icon selected by the user and a specific user gesture.

The step of starting to implement the task list may further include a step of user identification.

The user identification step may identify the user through code input or voice recognition.

The method for controlling the terminal may further include steps of allowing a user to pause the implementation of the task list freely; allowing the user to implement an additional input freely; and re-starting the task list.

The step of re-starting the task list may delete a task overlapped with the additional input and implement the following task.

The step of implementing the task list may further include a step of adjusting an implementation speed.

The method for controlling the terminal may further include a step of providing the tasks recorded sequentially to the user in a thumbnail image or a flow chart.

According to the method for controlling the terminal, the task list configured of the series of the tasks used by the user frequently is created and the task list is implemented automatically. Accordingly, the functions used frequently can be performed quickly.

Furthermore, the specific task that has to be input differently for a situation on the task list may be input differently by the user and the list of more various lists may be created. Accordingly, the terminal may be convenient to use advantageously.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The embodiments will be described in detail with reference to the following drawings in which like reference numerals refer to like elements wherein.

DESCRIPTION OF SPECIFIC EMBODIMENTS

In the following detailed description, reference is made to the accompanying drawing figures which form a part hereof, and which show by way of illustration various embodiments. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The various features described herein may be applicable to a various types of mobile terminals. Examples of such terminals may include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification may also be applicable to a fixed terminal such as a digital TV, a desktop computer and the like as well as a mobile terminal.

Figure 1:
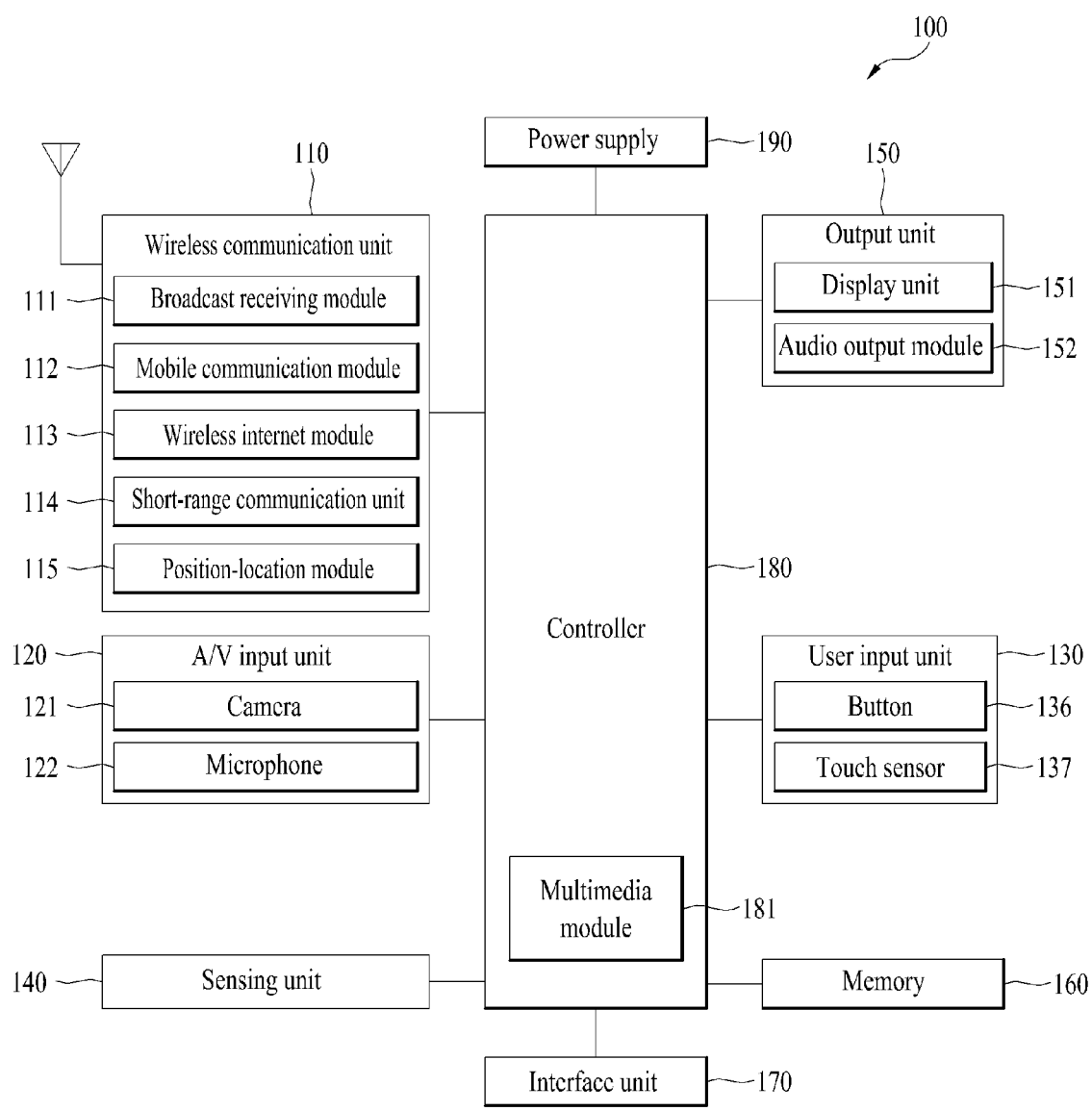
FIG. 1 is a block diagram of a mobile terminal according to an embodiment as broadly described herein.

FIG. 1 is a block diagram of a mobile terminal 100 in accordance with an embodiment as broadly described herein. The mobile terminal 100 may include a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

Referring to FIG. 1, the audio/video (A/V) input unit 120 may be configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151 of the output unit 150.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 may include assorted noise removing algorithms to remove noise generated in the course of receiving the external audio signal.

The user input unit 130 may generate input data responsive to user manipulation of an associated input device or devices. Examples of such devices include a button 136 provided to front/rear/lateral side of the mobile terminal 100 and a touch sensor (pressure sensitive touch/capacitive touch) 137 and may further include a key pad, a dome switch, a jog wheel, a jog switch and the like.

The sensing unit 140 may provide sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such a sensing unit 140 may include, a gyro sensor, an acceleration sensor, a geomagnetic sensor and the like.

The output unit 150 may generate outputs relevant to the senses of sight, hearing, touch and the like. The output unit 150 includes the display 151, an audio output module 152, an alarm unit 153, and a haptic module 154 and the like.

The display 151 may be implemented to visually display (output) information associated with the mobile terminal 100. For instance, if the mobile terminal is operating in a phone call mode, the display may provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

In case that the display 151 and the touch sensor 137 configures a mutual layer structure (hereinafter called 'touch screen'), it is able to use the display 151 as an input device as well as an output device. In this case, the touch sensor may be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

In addition, in the memory 160 may be stored data on various-patterned vibrations and sounds output when the user inputs a touch on the touchscreen.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices.

The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof A series of tasks used by the user frequently may be recorded and a task list having the series of the tasks recorded therein may be created and used so as to implement the series of the tasks automatically, without the user implementing each of the tasks repeatedly.

The task list may be directly created and used by the user or the task list created by a third person may be transmitted to the mobile terminal. In the embodiment, there may be provided an interrupt task that waits the user's additional input after instructing the user to stop the implementation performed according to the series of the tasks recorded in the task list, in case another task has to be implemented during the implementation of the series of the tasks for a different situation.

Referring to the drawings, a method for creating the task list having such an interrupt task or for implementing the task list and a method for editing the task list will be described as follows.

Figure 2:
FIGS. 2 to 9 are diagrams illustrating a process of creating a task list according to a method for controlling a mobile terminal.
Figure 2:
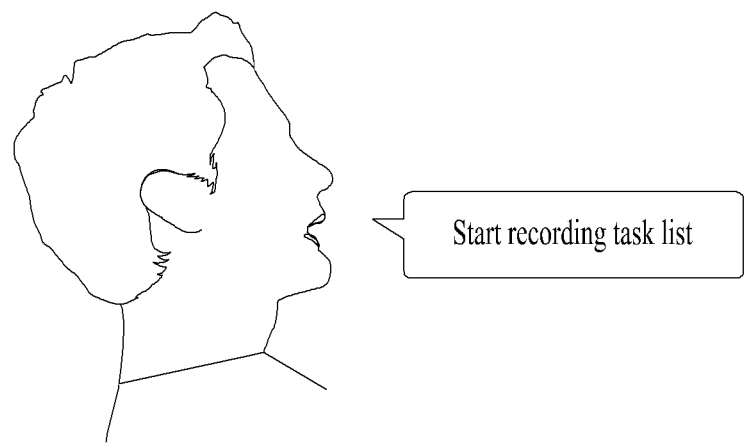

FIGS. 2 to 9 are diagrams illustrating a process of creating the task list according to a method for controlling a terminal. FIG. 2 shows that the task list starts to record the series of the tasks. The user touches an icon on the display 151 and presses the user input unit 130 or generates a voice command, only to start to record the task list.

Figure 5:
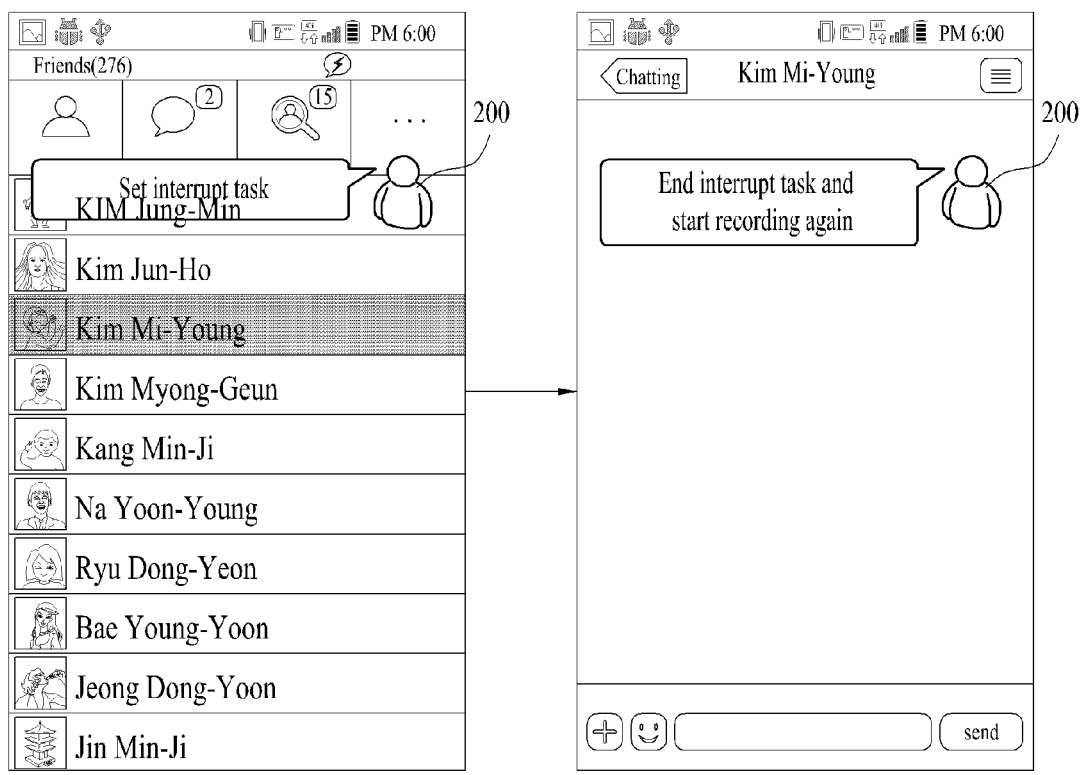
Figure 5:
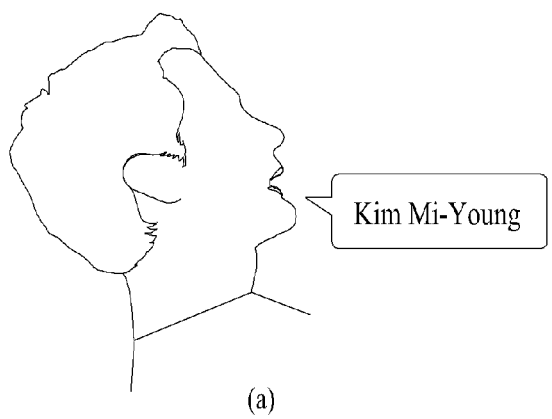

An indicator 200 may be displayed on the screen that shows a record state of the task list when recording the task list. The indicator 200 may be employed to indicate that the task list is during the recording as shown in FIG. 3 or to guide the user input during the recording of the task list as shown in FIG. 5.

Once the recording of the task list starts, a series of tasks according to the user input to the mobile terminal may be recorded. In this embodiment, a process of photographing and transmitting the photograph to the other person via an instant messenger application may be created in the task list.

Figure 3:
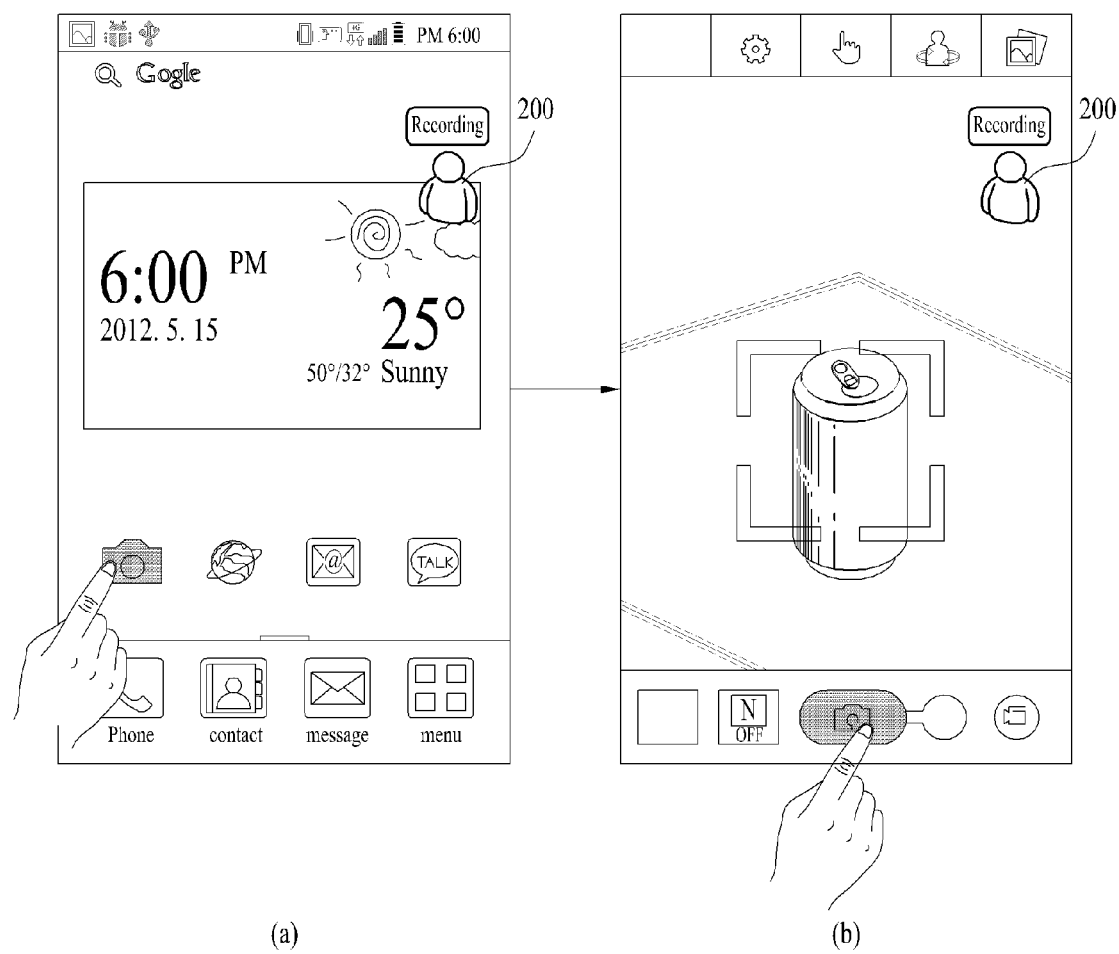
Figure 4:
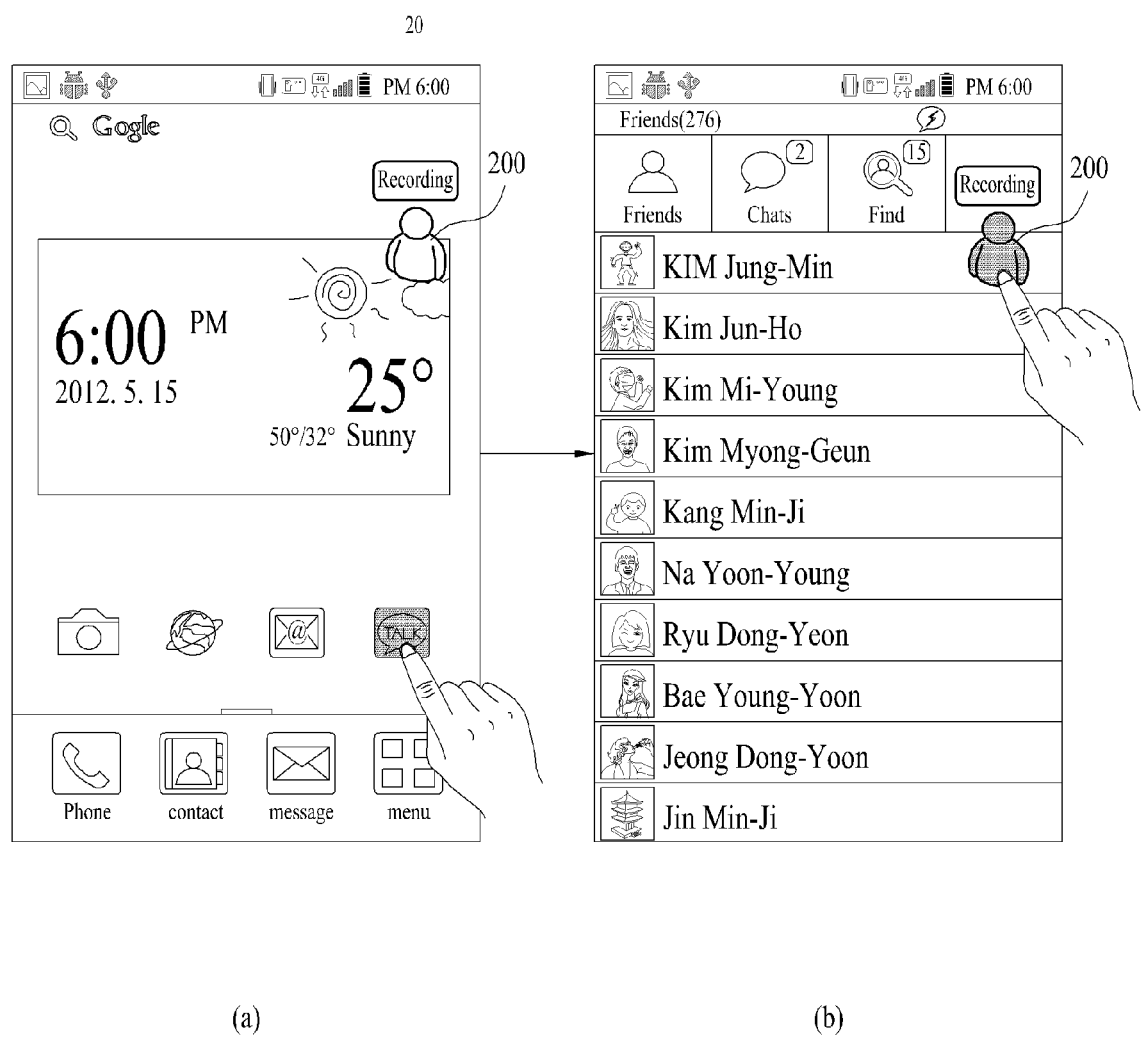

First of all, the user implements a camera function to photograph as shown in FIG. 3 and an instant messenger application as shown in FIG. 4 (a) after that.

In a task of selecting a person to which the photograph is transmitted in the instant messenger application, the photograph may be transmitted to another person for a different situation. The task of the selecting may be recorded as an interrupt task. In the interrupt task, implementation of a series of tasks is paused and an additional user input is waited. When there is the additional user input, following tasks of the task list are implemented.

In case a different input is required in a different situation in the tasks of the task list, the different input is designated as an interrupt task. In this instance, the task list may be created and used in a wide range of various functions.

For the interrupt task, the recording of the task list is paused according to a voice command or a touch of the indicator 200 as shown in FIG. 4. At this time, the indicator 200 may provide the guide for storing the interrupt task.

As shown in FIG. 5, the user inputs a command of selecting the other person via the voice or touch input. User commands are recorded in general tasks of the task list. However, it is recorded in the interrupt task only which type the user input is. Accordingly, when implementing the task list recorded as mentioned above, it is determined in a step of implementing the interrupt task whether the same type of a command is input as the command additionally input by the user.

The additional user input allows the user to select one of choices or to input a text. As it is determined that there is the additional user input, the interrupt task may end immediately and the recording of the task list may re-start as shown in FIG. 5 (b). Alternatively, when the interrupt task includes a plurality of user inputs, the user has to input an interrupt task ending command only to end the interrupt task and then may re-start to record the task list.

Figure 6:
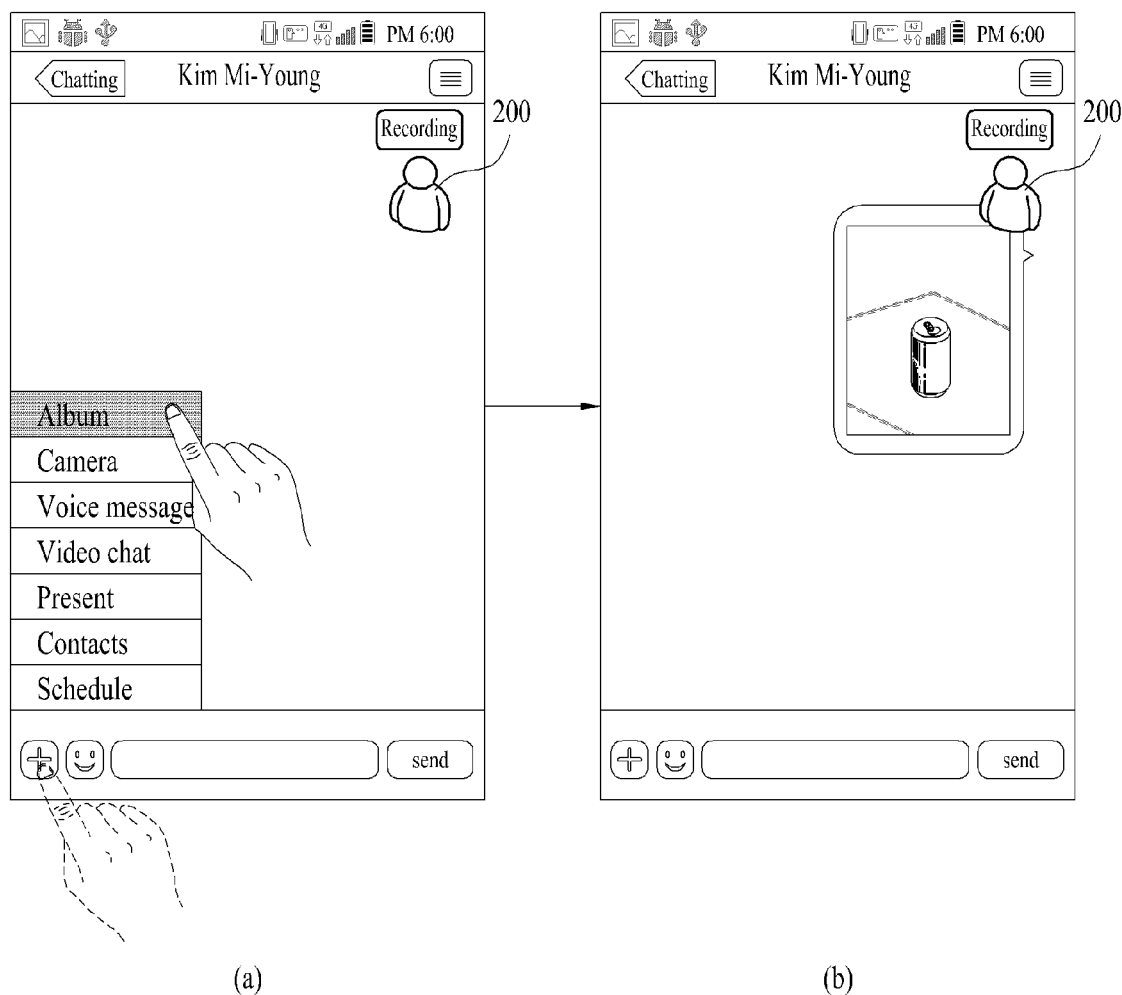
Figure 7:
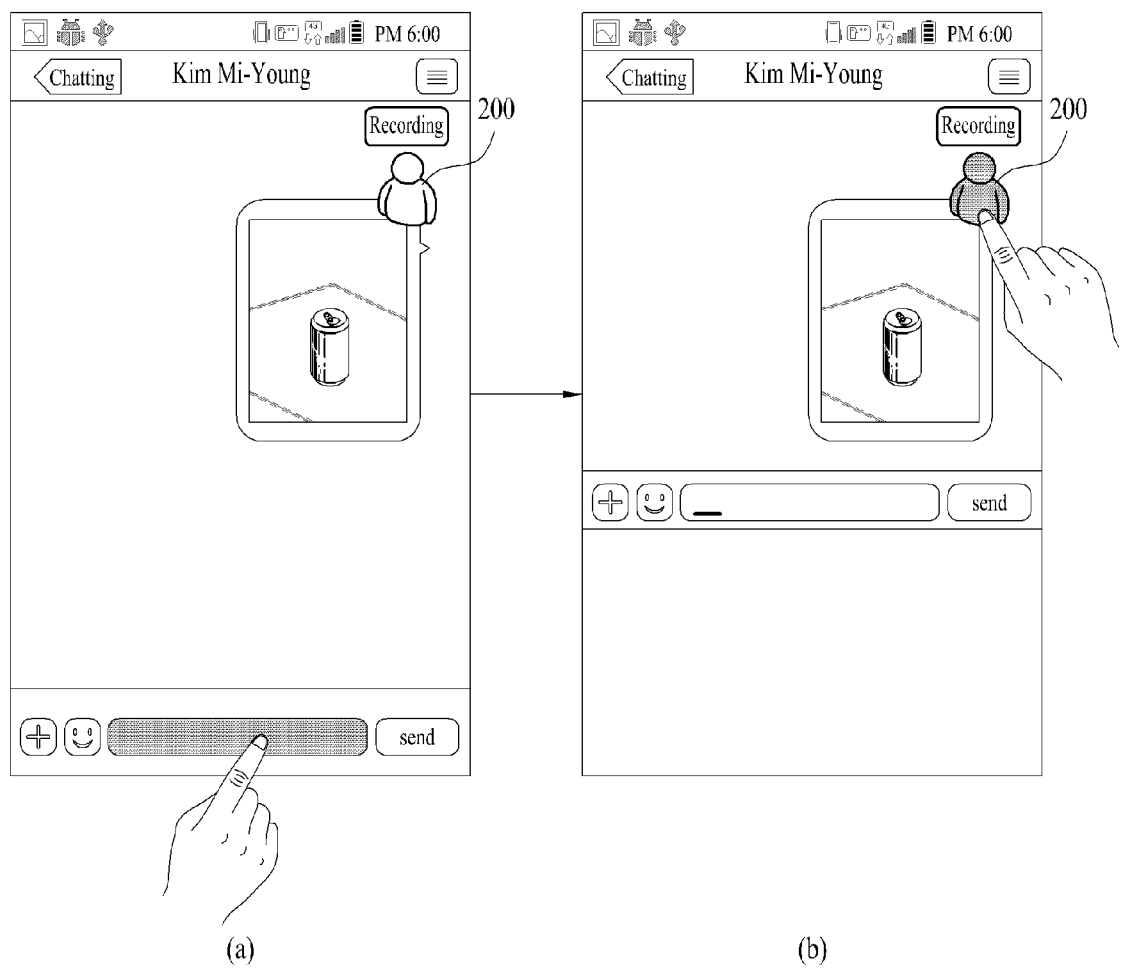
Figure 8:
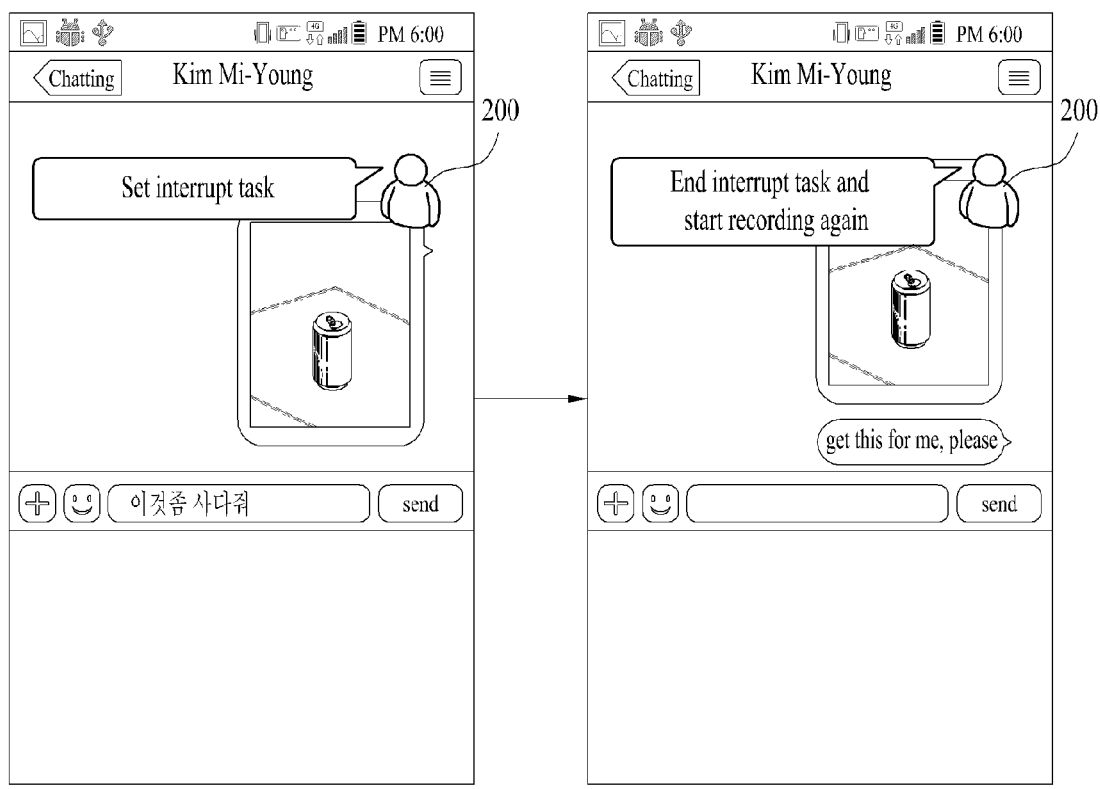
Figure 8:
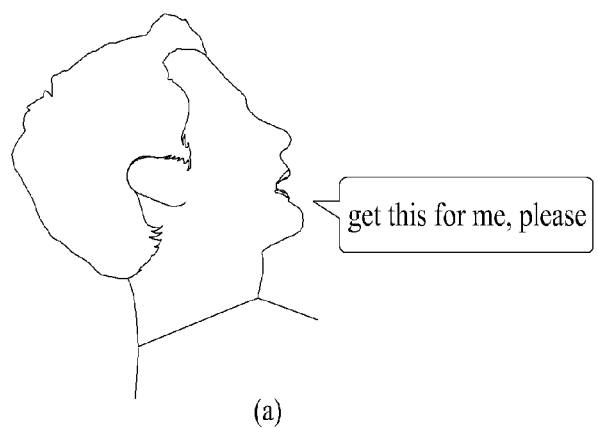

FIG. 6 shows that a task of transmitting the image photographed a moment ago to the selected user is recorded in the task list. FIG. 7 shows that a task of inputting a message after the image transmitting. The task may be designated as an interrupt task to allow the user to input a different message according to a situation.

To designate the interrupt task, the user touches the indicator 200 to pause the task recording and inputs a message which will be transmitted. At this time, the message may be input via a keypad or what the user says may be converted into a text message. Then, the message may be transmitted and the interrupt task may end. After that, the recording of the task list may re-start.

Figure 9:
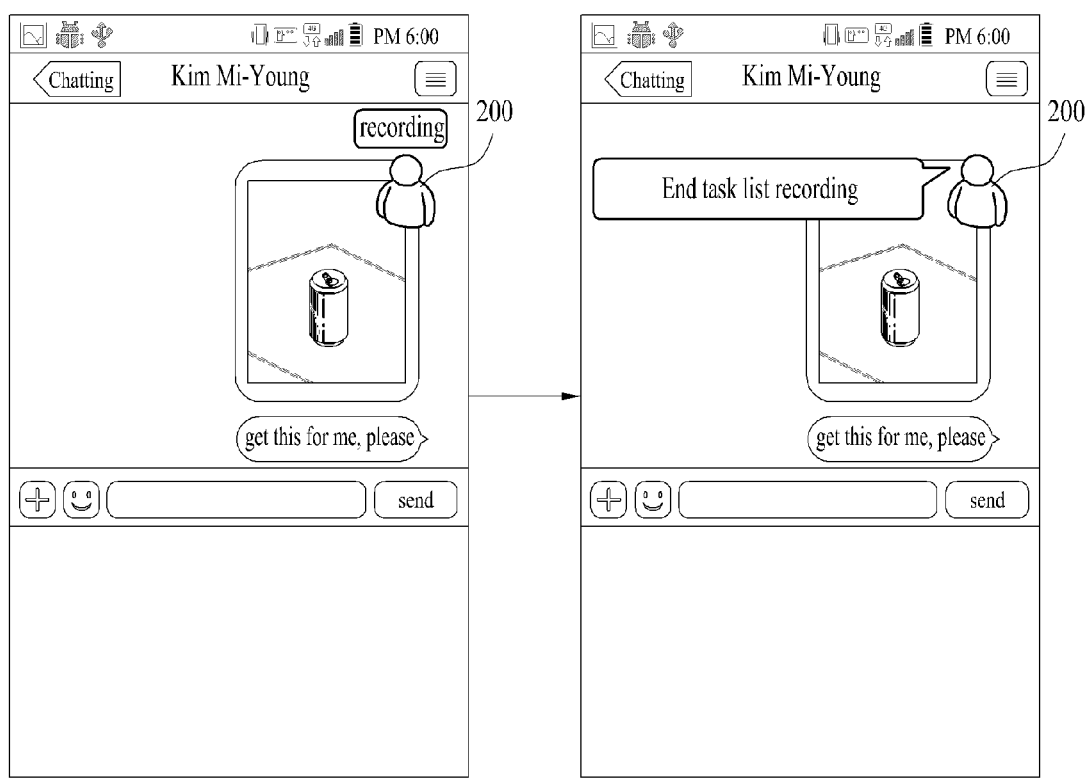
Figure 9:
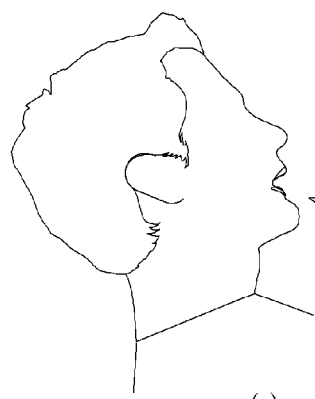

As shown in FIG. 9, a command for task end is input to end the task list recording. The task list created as mentioned above is stored as file and task list file can be transmitted to a third person. In addition, the task list file may be edited.

FIGS. 10 to 15 are diagrams illustrating a process of implementing the task list according to the method for controlling the terminal. Similar to the embodiment shown in FIGS. 2 to 9, the user may implement the created task list or the transmitted task list.

Figure 10:
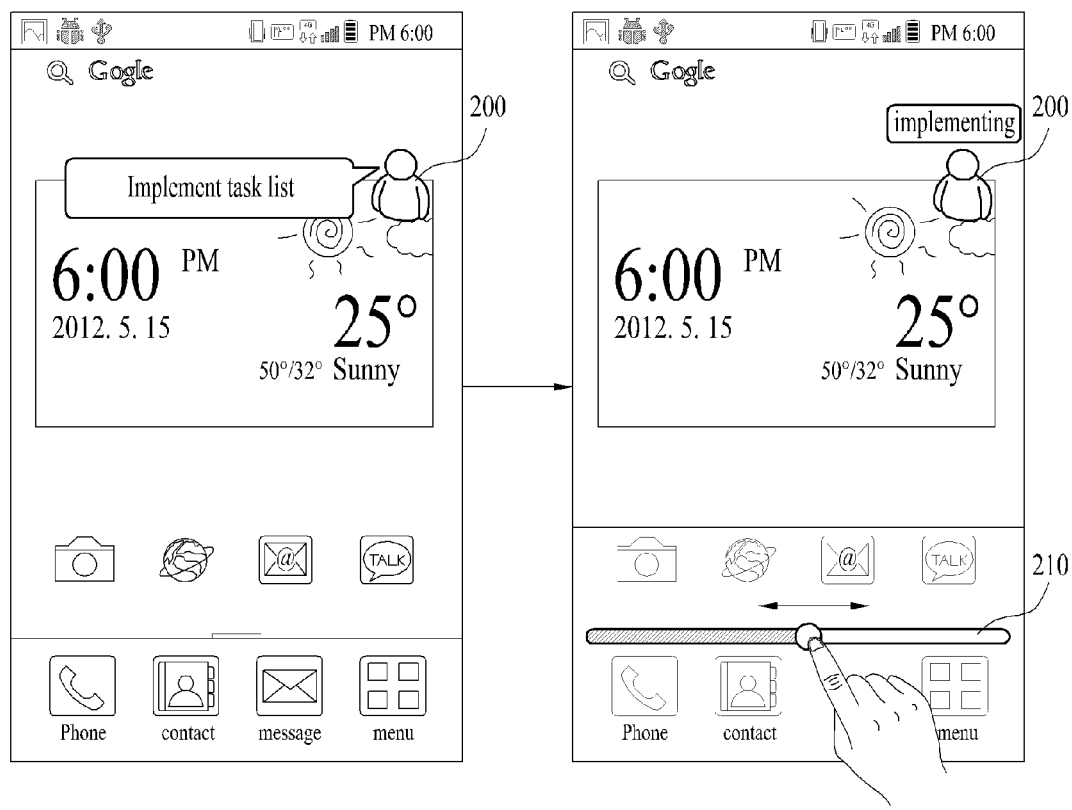
FIGS. 10 to 15 are diagrams illustrating a process of implementing the task list according to the method for controlling the mobile terminal.
Figure 10:
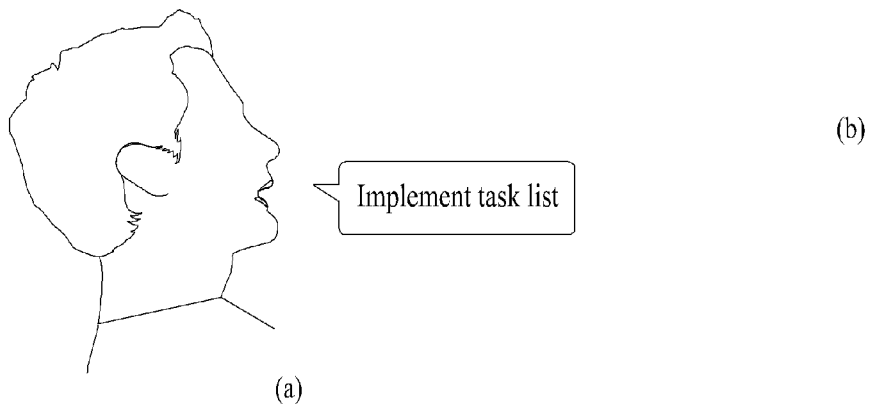

The task list may be implemented via a voice command as shown in FIG. 10 (a) or via a menu or an icon touched by the user. Even while the task list is implemented, an indicator 200 shown in FIG. 10 may be displayed on a screen to indicate that the task list is implementing.

As shown in FIG. 10 (b), the implementation of the task list is performed at a higher speed than a speed recorded basically such that it may be set to implement the task list faster than the user inputs the series of the tasks one by one. The user can control the implementation speed of the tasks directly. A state display bar may be displayed on the screen and the user may adjust the state bar, the tasks may be implemented at the same speed as the tasks are actually recorded or at a higher speed than the speed at which the tasks are actually recorded.

Figure 11:
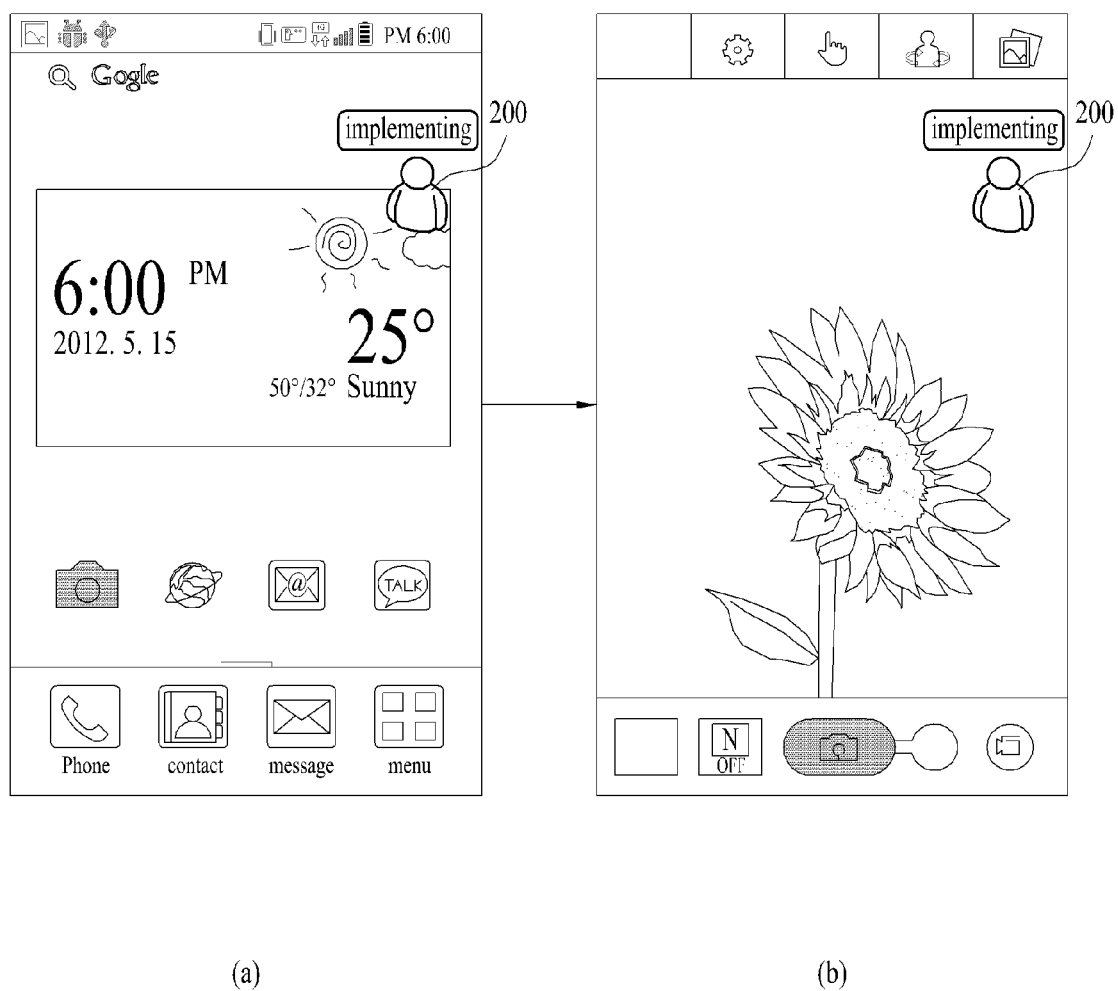
Figure 12:
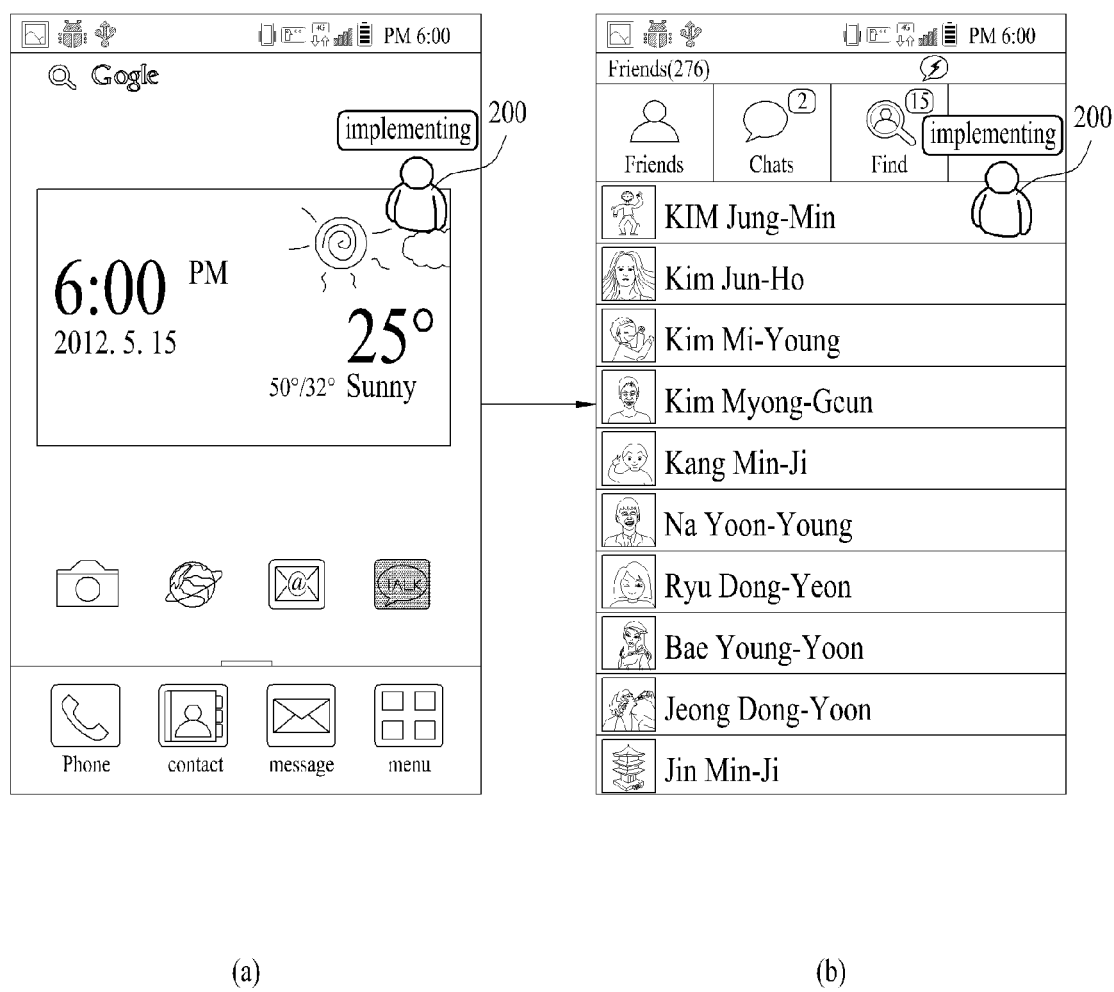

Once the implementation of the task list starts, a series of tasks shown in FIGS. 11 and 12 are implemented automatically. After that, a camera application is implemented automatically to photograph the image and an instant messenger application is implemented.

Once a user list is displayed, the interrupt task starts to implement and the process is paused to wait an additional user input. At this time, the indicator 200 may output a message to induce the user's additional input.

Figure 13:
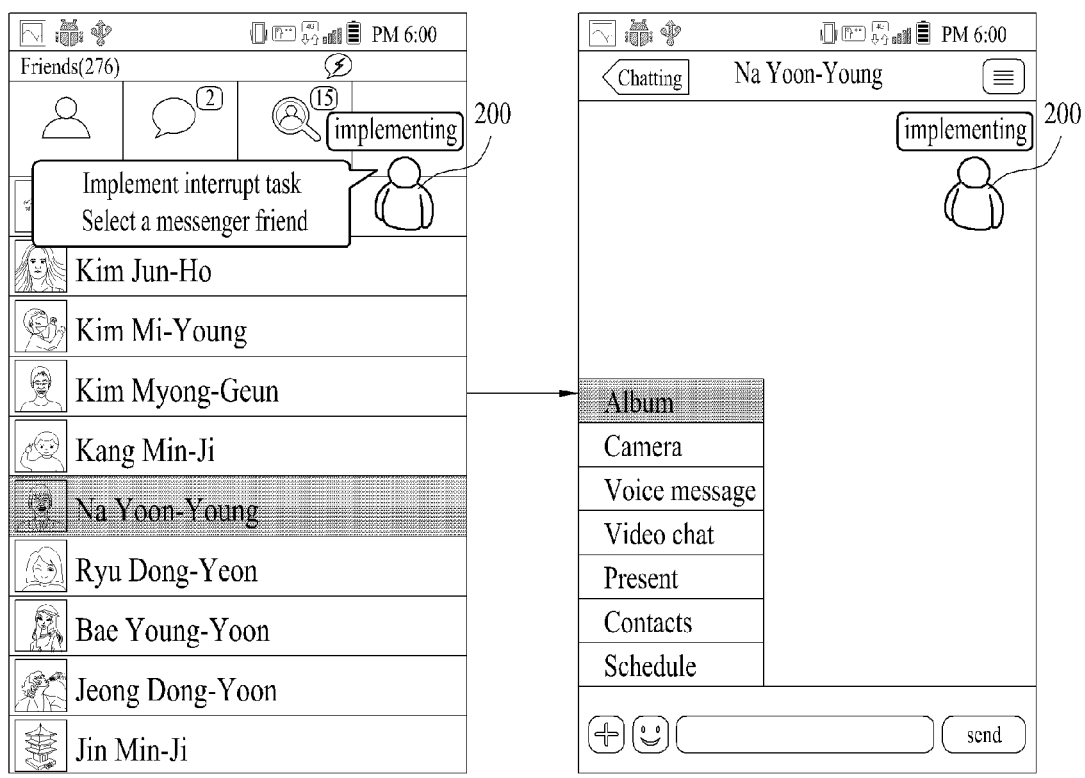
Figure 13:
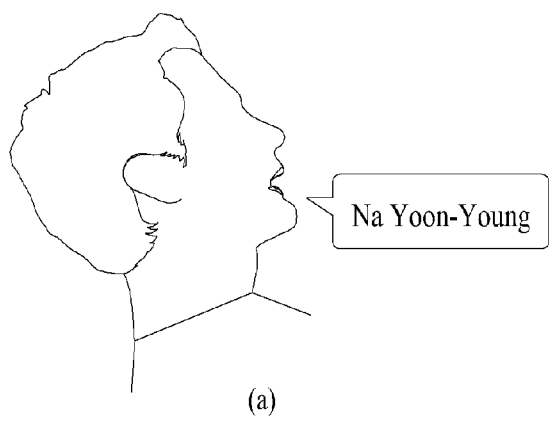

In case an additional input for selecting one of lists or icons is required as shown in FIG. 13, a message requesting to select one of lists may be provided. In case a text input is required as shown in FIG. 15, a message requesting a text input may be provided.

Figure 14:
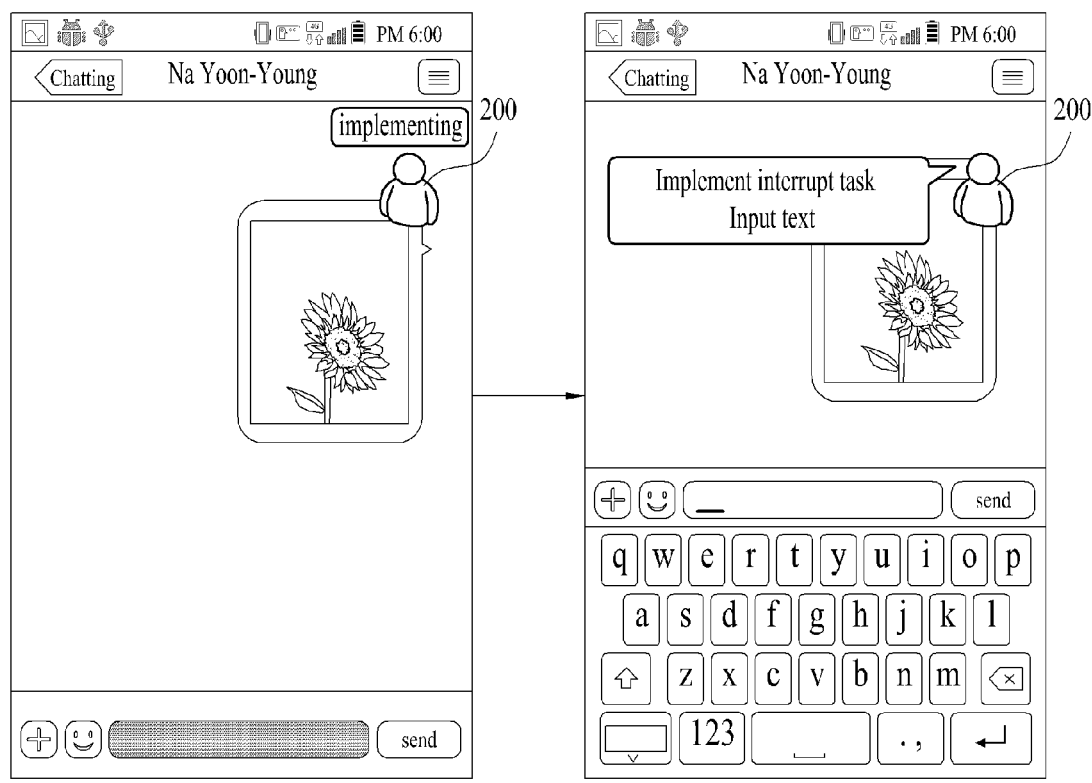
Figure 14:
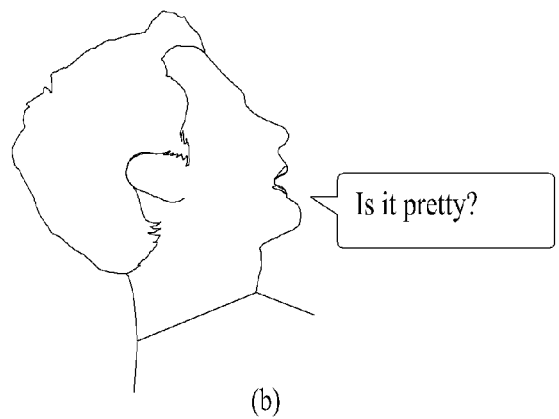

Once the user selects an instant messenger person, tasks are implemented in the order of the task list as shown in FIG. 14 and the images photographed recently are transmitted to the selected messenger friend automatically.

Figure 15:
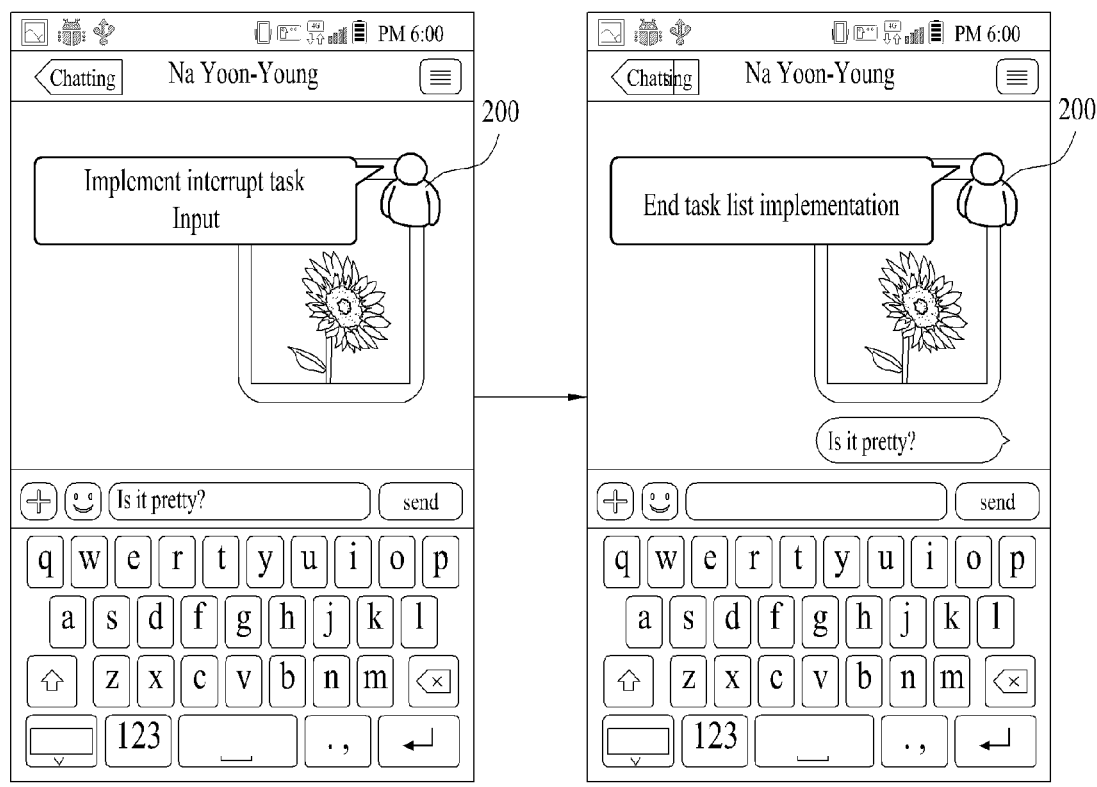
Figure 15:
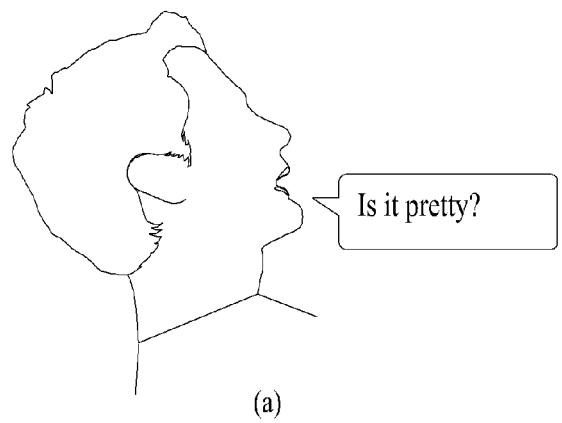

When the interrupt task for text input is implemented as shown in FIG. 15, the user inputs a message which will be transmitted to the other person on the instant messenger service. In case there is a plurality of commands to input during the implementation of the interrupt task, the interrupt task may end through a specific gesture touch and a voice command.

Once all of task operations on the task list complete, the task list implementation automatically end. At this time, the indicator 200 may indicate that the operations on the task list complete.

Figure 16:
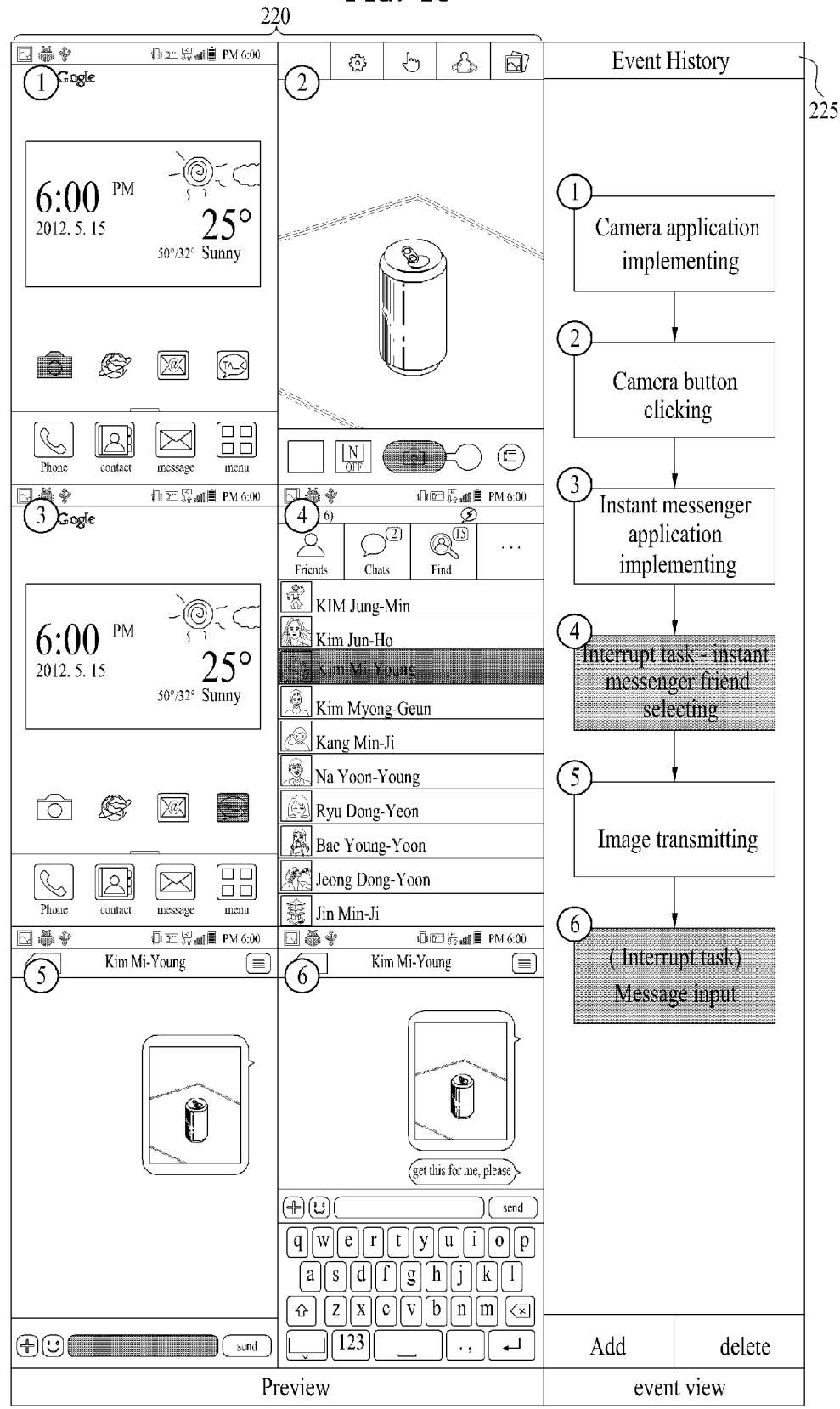
FIGS. 16 to 19 are diagrams illustrating a process of editing the task list according to the method for controlling the mobile terminal.

FIGS. 16 to 19 are diagrams illustrating a process of editing the task list according to the method for controlling the terminal. Each of tasks stored in the task list may be displayed on a screen as a thumbnail image 220 as shown in FIG. 16 or as a flow chart 225. Alternatively, each of the tasks stored in the task list may be provided as both of the flow chart 225 and the thumb nail image 220. A distinctive color or an identification mark may be provided to the flow chart 225 or the thumbnail image 220 to distinguish the interrupt task from the other general tasks.

Figure 17:
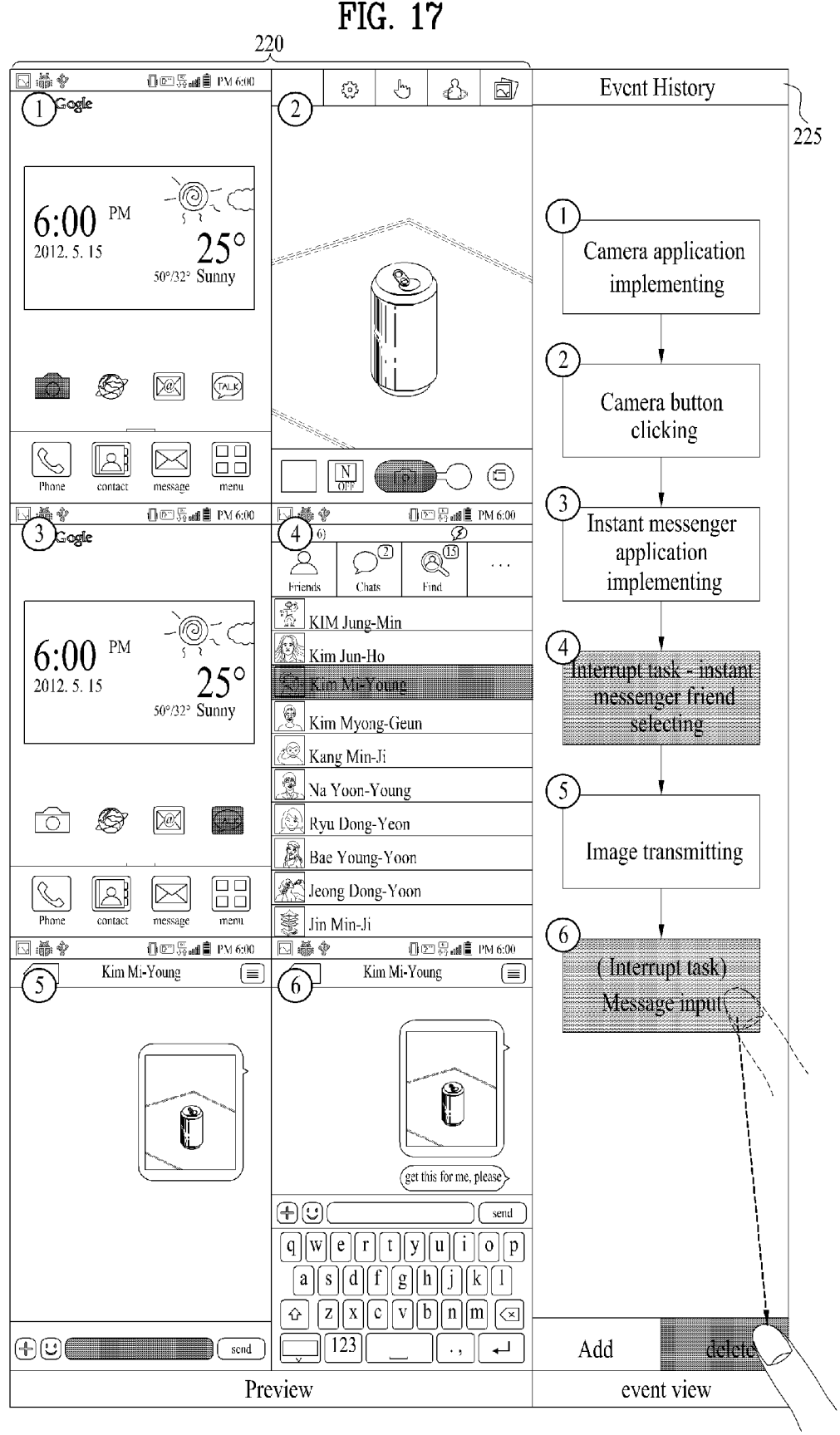

The user may delete one or more of the tasks as shown in FIG. 17. At this time, unless one or more of the tasks affect(s) the implementation of the task list, the user may delete the corresponding one or more of the tasks. In case continuous task implementation is impossible after the user deletes only the corresponding task, a message showing that it is impossible to delete the corresponding task and the task is controlled not to be deleted.

The deletion is performed through a delete button pressed by the user or by dragging the delete button in one direction. When one of the flow chart and the thumbnail image displayed on the screen as shown in FIG. 18 is deleted, the deletion is reflected in the other one and both of the flow chart and the thumbnail image disappear.

Figure 18:
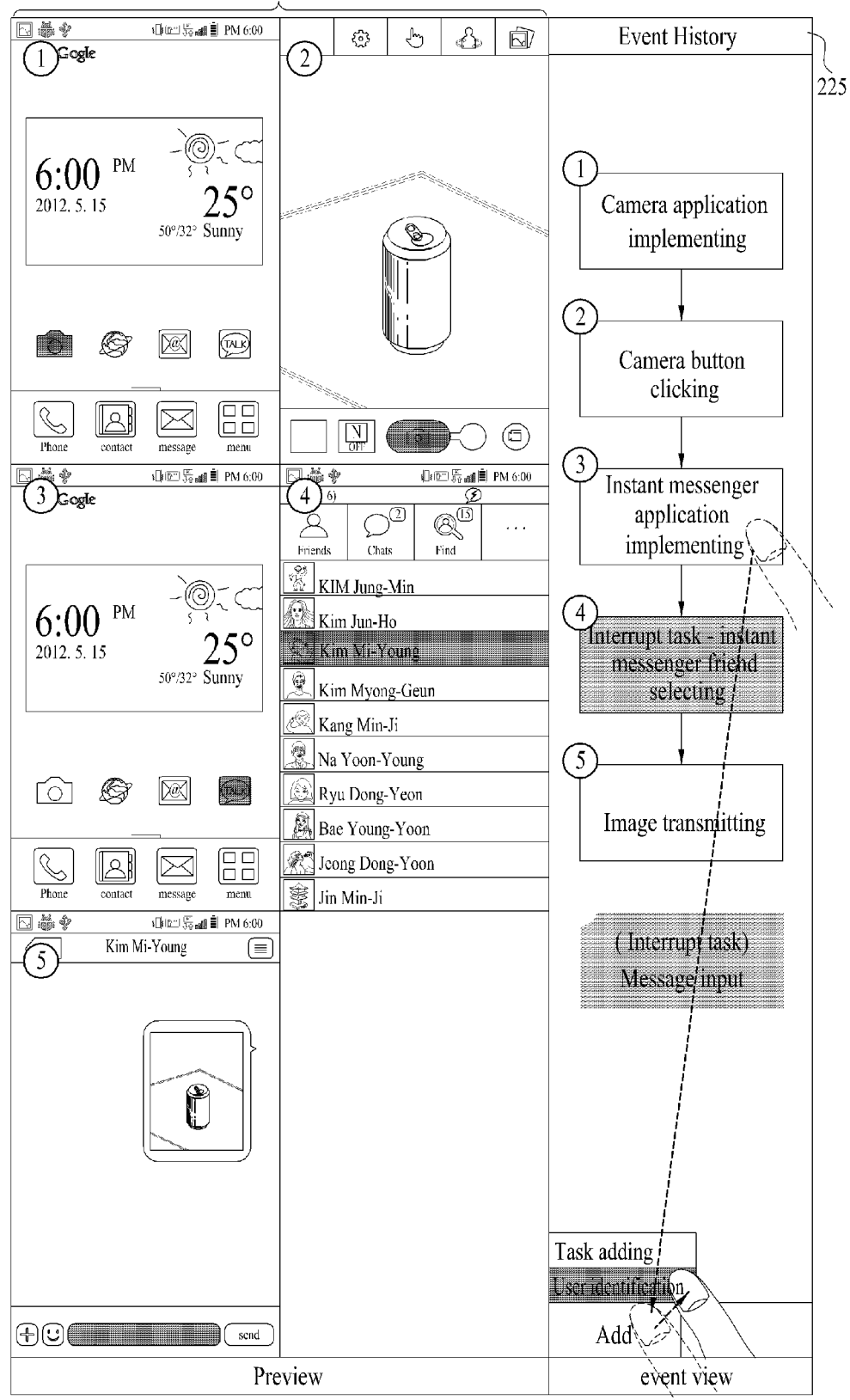

FIG. 18 shows a characteristic of adding specific contents to the interrupt task. As shown in FIG. 18, the user may add a task to the task list. In case a specific task is inserted in the middle of the tasks on the task list, a step of recording the task list may be provided to record the operation performed by the user and the specific task may be inserted in the task list.

Alternatively, a code may be set for a specific task as shown in FIG. 18. When setting a code for the specific task, the implementation of the task list is paused until the code is input, without starting to implement the next task. Accordingly, the code-set task may be an interrupt task.

Figure 19:
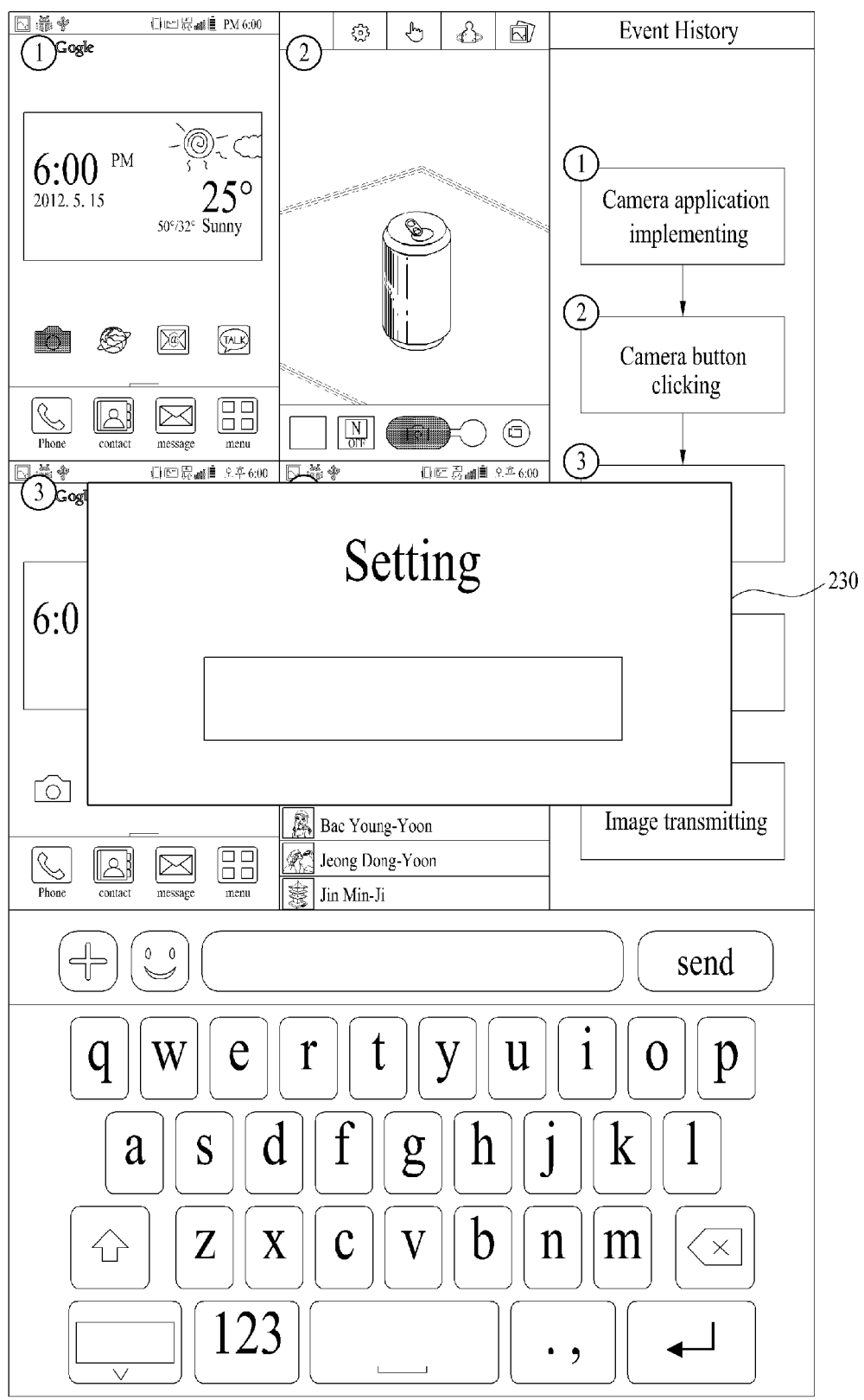

A task for selecting the code is selected and a code setting button is pressed. After that, a code input window 230 may be provided to set a code as shown in FIG. 19. The code may be set in a method of inputting characters or numbers or using the user voice.

As described above, the task list configured of the series of the tasks used by the user frequently is created and the task list is implemented automatically. Accordingly, the functions used frequently can be performed quickly.

Furthermore, the specific task that has to be input differently for a situation on the task list may be input differently by the user and the list of more various lists may be created. Accordingly, the terminal may be convenient to use advantageously.

When a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of creating a task list for controlling a terminal, the method comprising:
   starting to record tasks;
   creating the task list by recording the tasks including general tasks and an interrupt task, when a plurality of tasks are implemented sequentially;
   recording entire information of user inputs as the general tasks;
   pausing the recording the general tasks when an additional user input is detected;
   recording type information of the additional user input as the interrupt task;
   re-starting the recording the general tasks after recording the interrupt task; and
   ending the recording of the general tasks,
   wherein the type information is a predetermined portion of the entire information associated with a user input,
   wherein the interrupt task is a user identification step, selecting one of objects or inputting a text.

2. The method for controlling the terminal according to claim 1, wherein the starting to recording the tasks or the ending the recording is performed by at least one of a user voice command, specific icon selected by the user and a specific gesture.

3. The method for controlling the terminal according to claim 1, wherein the creating the task list comprises:
   pausing the recording of the task list; and
   re-starting the recording of the task list, when there is an additional user input.

4. The method for controlling the terminal according to claim 3, wherein the pausing the recording of the task list pauses the recording of the task list, when an indicator configured to indicate a state of each step is selected.

5. The method for controlling the terminal according to claim 1, wherein the input text is a text converted from the user voice.

6. The method for controlling the terminal according to claim 1, wherein the task list is stored as a file and the file is transmittable to another terminal.

7. The method for controlling the terminal according to claim 1, further comprising:
   providing the tasks of the task list to the user in a thumbnail image or a flow chart.

8. The method for controlling the terminal according to claim 1, wherein the task list are performed at least one of task order changing, task deleting, task adding and task code setting.

9. The method for controlling the terminal according to claim 1, wherein an indicator configured to guide a state of each step is displayed.

10. A method of implementing a task list for controlling a terminal, the method comprising:
    creating or transmitting the task list comprising general tasks and an interrupt task arranged sequentially;
    starting to implement the task list;
    implementing the general tasks sequentially until the interrupt task;
    pausing the task implementation when the interrupt task is detected; and
    implementing a general task following the interrupt task, when a same type of an additional user input with recorded type information of an additional user input is detected,
    wherein the type information is a predetermined portion of the entire information associated with a user input,
    wherein the starting to implement the task list further comprises user identification, and
    wherein the interrupt task is the user identification, selecting one of objects or inputting a text.

11. The method for controlling the terminal according to claim 10, wherein the starting to implement the task list is performed through at least one of a user voice command, a specific icon selected by the user and a specific user gesture.

12. The method for controlling the terminal according to claim 10, wherein the user identification identifies the user through code input or voice recognition.

13. The method for controlling the terminal according to claim 10, further comprising:
    allowing a user to pause the implementation of the task list freely;
    allowing the user to implement an additional input freely; and
    re-starting the task list.

14. The method for controlling the terminal according to claim 13, wherein the re-starting the task list implements the following tasks.

15. The method for controlling the terminal according to claim 10, wherein the implementing the task list further comprises a step of adjusting an implementation speed.

16. The method for controlling the terminal according to claim 10, further comprising:

providing the tasks in the task list to a user in a thumbnail image or a flow chart.

* * * * *